(12) United States Patent
Odate

(10) Patent No.: US 9,969,369 B2
(45) Date of Patent: May 15, 2018

(54) VEHICLE BRAKE SYSTEM

(71) Applicant: HONDA MOTOR CO., LTD., Tokyo (JP)

(72) Inventor: Shotaro Odate, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 59 days.

(21) Appl. No.: 15/138,879

(22) Filed: Apr. 26, 2016

(65) Prior Publication Data

US 2016/0311413 A1 Oct. 27, 2016

(30) Foreign Application Priority Data

Apr. 27, 2015 (JP) ................................. 2015-090697

(51) Int. Cl.
*B60T 7/22* (2006.01)
*B60T 8/72* (2006.01)
*B60T 8/48* (2006.01)

(52) U.S. Cl.
CPC .................... *B60T 7/22* (2013.01); *B60T 8/72* (2013.01); *B60T 8/4872* (2013.01); *B60T 2201/024* (2013.01)

(58) Field of Classification Search
CPC .... B60T 7/22; B60T 8/4872; B60T 2201/024; B60T 8/72
USPC ...... 303/16, 191, 125; 701/70; 180/275, 175
See application file for complete search history.

(56) References Cited

U.S. PATENT DOCUMENTS

| 6,017,102 | A | * | 1/2000 | Aga | .................... B60T 7/12 303/125 |
| 6,105,705 | A | * | 8/2000 | Faye | .................... B60T 7/12 180/275 |
| 7,353,087 | B2 | * | 4/2008 | Takafuji | .......... B60R 21/0136 280/728.1 |
| 9,630,603 | B2 | * | 4/2017 | Odate | .................... B60T 8/885 |
| 2002/0020575 | A1 | * | 2/2002 | DeLuca | ................. B60T 7/042 180/275 |
| 2006/0097504 | A1 | * | 5/2006 | Akaba | ................... B60R 21/013 280/806 |
| 2011/0004385 | A1 | * | 1/2011 | Ishimoto | ................. B60T 7/12 701/70 |
| 2013/0218433 | A1 | * | 8/2013 | Matsuno | .............. B60W 30/09 701/70 |

(Continued)

FOREIGN PATENT DOCUMENTS

JP 2012-1091 A 1/2012

*Primary Examiner* — Thomas J Williams
(74) *Attorney, Agent, or Firm* — Westerman, Hattori, Daniels & Adrian, LLP

(57) ABSTRACT

A vehicle brake system includes a master cylinder that generates a hydraulic pressure according to an operation amount of a brake pedal, a vehicle stabilization device that generates a hydraulic pressure in response to a hydraulic pressure generation command received from a brake controller, and front brake operation sections and rear brake operation sections that are actuated by the hydraulic pressure generated by the master cylinder or by the vehicle stabilization device and that generate braking force on the vehicle. A brake controller actuates automatic braking when an impact has been detected by a collision detection sensor, and actuates the automatic braking with smaller braking force when an engine is stopped than when the engine is running.

3 Claims, 5 Drawing Sheets

(56) References Cited

U.S. PATENT DOCUMENTS

2014/0350811 A1* 11/2014 Tamaru ................ B60W 10/02
  701/68

* cited by examiner

VEHICLE BRAKE SYSTEM

CROSS REFERENCES TO RELATED APPLICATIONS

The present application claims priority under 35 U.S.C. § 119 to Japanese Patent Application No. 2015-090697, filed Apr. 27, 2015, entitled "Vehicle Brake System," The contents of this application are incorporated herein by reference in their entirety.

BACKGROUND

1. Field

The present disclosure relates to a vehicle brake system.

2. Description of the Related Art

Japanese Unexamined Patent Application Publication No. 2012-001091 describes a vehicle brake control device (vehicle brake system). When a collision of the vehicle has been detected by collision detection sensors, the vehicle brake control device automatically actuates a brake controller (actuates automatic braking) in accordance with a vehicle speed detected by a speed sensor. The vehicle is then braked automatically after a collision by the thus configured brake control device.

The brake control device described in Japanese Unexamined Patent Application Publication No. 2012-001091 actuates the brake controller (actuates automatic braking) when a collision of the vehicle has been detected.

As long as electrical power is being supplied to electrical components such as sensors, the brake control device actuates the brake controller when a collision has been detected, even if the engine of the vehicle is in a stopped state, such as when the ignition is off, or during an idling stop or engine stall. For example, the brake control device actuates the brake controller when another vehicle collides with the vehicle while the vehicle is stopped.

However, when the engine is stopped, since the vehicle is stationary, the vehicle speed is not that high even if the vehicle starts to move due to, for example, the collision. Thus, the vehicle is sufficiently braked even if the braking force generated by actuation of the brake controller is small.

For an electrical brake controller, the electrical power consumption of the brake controller is suppressed when a small braking force is generated, enabling exhaustion of electrical power stored in a storage device (such as a battery) to be suppressed by reducing the braking force generated by the brake controller.

Electricity is not being generated by the alternator when the engine has stopped, and sometimes problems occur if the stored electrical power has been exhausted, such as when the engine is restarted. When the engine is stopped, it is accordingly desirable to suppress, by as much as possible, the stored electrical power from being exhausted by the brake controller.

Moreover, in a stopped state of the engine, if a collision with the vehicle has occurred and, furthermore, the brake controller is actuated and a large braking force is generated, occupants of the vehicle, such as the driver, receive a double collision impact, both when the collision with the vehicle occurs, and also when the vehicle is braked by the braking force. Sometimes the driver, for example, is in a relaxed posture in a vehicle with a stopped engine. Thus the driver, for example, receives a double impact while in an unstable posture, and is liable to be greatly affected by the impacts.

Due to the above, it is accordingly preferable for the braking force generated by actuating a brake controller to be small in cases in which a collision of a vehicle has been detected while the engine is in a stopped state.

SUMMARY

The present application describes a vehicle brake system that actuates automatic braking and suppresses the braking force generated while an engine is in a stopped state.

The present application is a vehicle brake system including a first hydraulic pressure generator that generates a hydraulic pressure in hydraulic oil in accordance with an operation amount of a brake actuation section (an actuation member such as a brake pedal), a second hydraulic pressure generator that generates a hydraulic pressure in the hydraulic oil in response to a hydraulic pressure generation command received from a brake controller, and at least one brake operation section (a brake operation device or assembly provided to each vehicle wheel) that is actuated by the hydraulic pressure generated in the hydraulic oil in the first hydraulic pressure generator or by the hydraulic pressure generated in the hydraulic oil in the second hydraulic pressure generator, and that generates braking force to brake at least one wheel of a vehicle. The brake controller causes the second hydraulic pressure generator to generate the hydraulic pressure and actuate automatic braking when a sensor installed to the vehicle has detected an impact. The brake controller actuates the automatic braking such that the braking force is smaller when an engine of the vehicle is stopped than when the engine is running.

In automatic braking actuation to automatically generate braking force in the vehicle using the present application, the braking force when the engine is stopped is smaller than the braking force when the engine is running. The hydraulic pressure generated by the second hydraulic pressure generator is also smaller, such that, in cases in which the second hydraulic pressure generator is equipped with an electrical pressurizing device, for example, to generate hydraulic pressure, the electrical power consumed by the pressurizing device is suppressed.

The impact generated when the vehicle is braked by the braking force is also smaller, such that the impact to the driver, for example, is reduced.

The present application may include a plurality of the brake operation sections each of which is installed to a corresponding one of the wheels, and may further include a parking brake device that locks at least one of the wheels and maintains the vehicle in a stationary state. In such cases, when the brake controller actuates the automatic braking in a state in which one or more of the wheels are locked by actuation of the parking brake device, the brake controller causes the hydraulic pressure to be supplied to the brake operation sections installed to the wheels that are not locked, and actuates the respective brake operation sections.

According to this aspect of the present application, when one or more of the wheels are locked by actuation of the parking brake device, the brake controller controls the second hydraulic pressure generator such that hydraulic pressure is supplied to the brake operation sections installed to the wheels that are not locked. In cases in which the second hydraulic pressure generator is equipped with an electrical pressurizing device that generates hydraulic pressure, the electrical power consumed by the pressurizing device is suppressed compared to cases in which hydraulic pressure is supplied to the brake operation sections installed to all the wheels.

In the present application, the second hydraulic pressure generator may include an electrical pressurizing device that is driven to generate the hydraulic pressure in response to the hydraulic pressure generation command. In such cases, the brake controller controls the pressurizing device to actuate the automatic braking such that the hydraulic pressure is smaller when the engine is stopped than when the engine is running.

According to this aspect of the present application, the second hydraulic pressure generator is installed with the electrical pressurizing device, and hence the electrical power consumed by the pressurizing device is suppressed when automatic braking is actuated when the engine is in a stopped state, compared to when the engine is running.

DESCRIPTION OF THE PREFERRED EMBODIMENTS

An embodiment of the present application is described in detail with reference to the drawings as appropriate.

Figure 1:
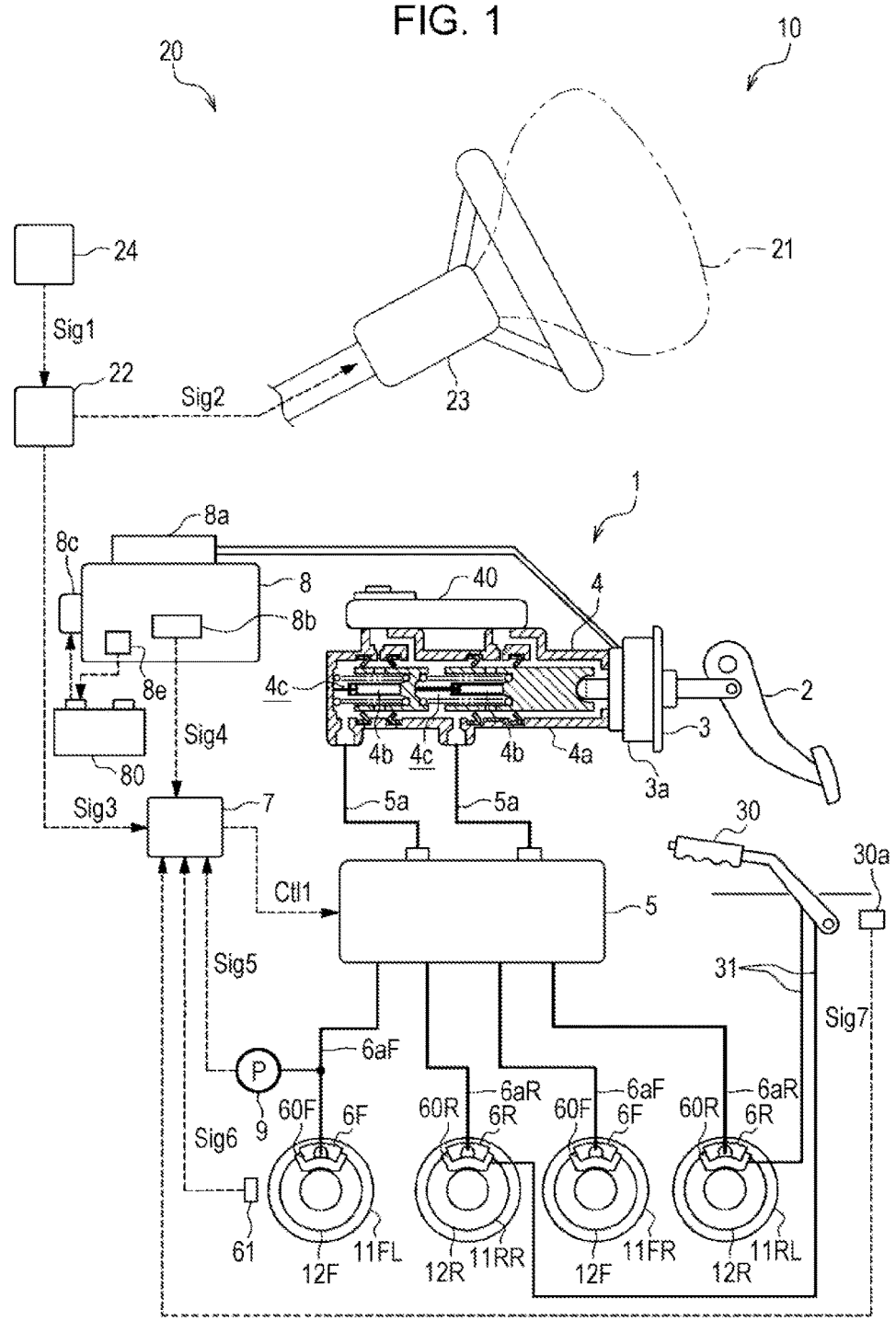
FIG. 1 is a diagram illustrating a vehicle installed with a vehicle brake system according to the present embodiment.

FIG. 1 is a diagram illustrating a vehicle installed with a vehicle brake system according to the present embodiment.

A vehicle 10 includes a vehicle brake system 1. The vehicle brake system 1 has a known, general structure (a hydraulic brake), and a simple explanation of the structure follows.

As illustrated in FIG. 1, the vehicle brake system 1 of the present embodiment includes a brake pedal 2, a brake booster 3, a master cylinder 4, a vehicle stabilization device 5, brake operation sections (front brake operation sections 6F and rear brake operation sections 6R), and a brake controller 7.

The brake pedal 2 is a brake actuation section operated by a driver (by foot-press operation).

The brake booster 3 is a booster unit that boosts the operation force (foot-press operation force) when the driver has foot-pressed and operated the brake pedal 2, so as to assist foot-press operation of the brake pedal 2 by the driver. The brake booster 3 includes a booster body 3a that is connected to a negative pressure generator. In the present embodiment, the booster body 3a is connected to an air intake pipe 8a of an engine S. The engine 8 is installed as the drive source of the vehicle 10. In the present embodiment, the air intake pipe 8a of the engine 8 is the negative pressure generator. The brake booster 3 uses negative pressure generated by the engine 8 (air intake pipe 8a) and supplied inside the booster body 3a to boost foot-press operation force when the brake pedal 2 has been foot-press operated. The brake booster 3 may be configured with a vacuum pump (negative pressure pump) (not illustrated) as the negative pressure generator connected to the booster body 3a.

The master cylinder 4 is a first hydraulic pressure generator that generates hydraulic pressure in hydraulic oil in accordance with the foot-press operation of the brake pedal 2 by the driver. The master cylinder 4 includes pistons 4b housed inside a circular cylindrical body 4a. The pistons 4b slide inside the body 4a, and compress the hydraulic oil inside the body 4a to generate hydraulic pressure.

The master cylinder 4 generates hydraulic pressure in the hydraulic oil in accordance with the foot-press operation amount (the brake stroke) of the brake pedal 2.

The pistons 4b operate with the foot-press operation force boosted by the brake booster 3.

The foot-press operation force when the driver foot-press operates the brake pedal 2 is boosted by the brake booster 3, and the pistons 4b in the master cylinder 4 operate with the boosted foot-press operation force, and generate hydraulic pressure in the hydraulic fluid.

There are two of the pistons 4b disposed in series in the master cylinder 4. The inside of the body 4a is divided into two hydraulic chambers 4c by the two pistons 4b, in a configuration such that a hydraulic pressure is generated by each of the two hydraulic chambers 4c.

The hydraulic pressures generated by the two hydraulic chambers 4c are supplied to the vehicle stabilization device 5 through two pipes 5a individually connected to the hydraulic chambers 4c.

A reservoir tank 40 is installed to the master cylinder 4. The reservoir tank 40 stores hydraulic oil. The inside of the reservoir tank 40 is in communication with the two hydraulic chambers 4c formed in the master cylinder 4.

The vehicle stabilization device 5 supplies hydraulic pressure input through the pipes 5a, through front pipes 6aF to the front brake operation sections 6F, and through rear pipes 6aR to the rear brake operation sections 6R. The vehicle stabilization device 5 functions as a second hydraulic pressure generator that generates hydraulic pressure for supply to the front brake operation sections 6F and the rear brake operation sections 6R in response to a command (a hydraulic pressure generation command Ctl1) input from the brake controller 7. In the present embodiment, the brake controller 7 is a controller that controls the vehicle stabilization device 5 (second hydraulic pressure generator) so as to generate hydraulic pressure in the hydraulic oil.

The vehicle stabilization device 5 is described later in detail.

The front brake operation sections 6F are installed individually to the wheels (a front left wheel 11FL and a front right wheel 11FR) at the front of the vehicle 10, and generate braking force to brake the front left wheel 11FL and the front right wheel 11FR. The rear brake operation sections 6R are installed individually to the wheels (a rear right wheel 11RR and a rear left wheel 11RL) at the rear of the vehicle 10, and generate braking force to brake the rear right wheel 11RR and the rear left wheel 11RL. The front brake operation sections 6F are, for example, calipers (front wheel calipers 60F) that generate braking force by clinching respective discs (front wheel discs 12F) that rotate together with the front left wheel 11FL and the front right wheel 11FR. Similarly, the rear brake operation sections 6R are, for example, calipers (rear wheel calipers 60R) that generate braking force by clinching respective discs (rear wheel discs 12R) that rotate together with the rear right wheel 11RR and the rear left wheel 11RL.

The braking force generated by the front brake operation sections 6F and the rear brake operation sections 6R results in braking force on the vehicle 10. The front-brake operation sections 6F and the rear brake operation sections 6R are actuated hydraulically.

In the following, the front left wheel 11FL, the rear right wheel 11RR, the front right wheel 11FR, and the rear left wheel 11RL may be referred to collectively below simply as "the wheels".

A hydraulic pressure gauge 9 is installed to the front pipe 6aF that supplies hydraulic pressure to the front brake operation section 6F installed in the front left wheel 11FL. The hydraulic pressure gauge 9 measures the hydraulic pressure in the front pipe 6aF, and inputs a signal (hydraulic pressure signal Sig5) of this measurement to the brake controller 7. The brake controller 7 acquires the hydraulic pressure in the pipe (the front pipe 6aF) based on the hydraulic pressure signal Sig5. In the present embodiment, the hydraulic pressure in the front pipe 6aF is a caliper pressure for driving the calipers (the front wheel calipers 60F and the rear wheel calipers 60R). That is, the brake controller 7 acquires a caliper pressure based on the hydraulic pressure signal Sig5.

FIG. 1 shows a single hydraulic pressure gauge S installed to the front pipe 6aF connected to the front brake operation section 6F installed in the front left wheel 11FL. However, configuration may be made such that there are hydraulic pressure gauges 9 individually connected to the front pipes 6aF and the rear pipes 6aR. In such cases, the brake controller 7 acquires the caliper pressure based on the hydraulic pressure signals Sig5 input from the four hydraulic pressure gauges 9.

For example, the brake controller 7 may employ, as the caliper pressure, an average value of four hydraulic pressures computed from the four respective hydraulic pressure signals Sig5.

A wheel speed sensor 61 is installed to at least one of the wheels. The wheel speed sensor 61 of the present embodiment converts the number of revolutions for the wheels over a certain period into a pulse wave signal (vehicle speed signal Sig6), and inputs the pulse wave signal to the brake controller 7. The brake controller 7 computes the rotation speed for the wheels based on the vehicle speed signal Sig6, and also computes the vehicle speed (vehicle body speed) of the vehicle 10 based on the vehicle wheel rotation speed.

Note that although FIG. 1 illustrates a single wheel speed sensor 61 installed to the front left wheel 11FL, configuration may be made with wheel speed sensors 61 individually installed to the wheels. In such cases, the brake controller 7 computes the vehicle speed based on the vehicle speed signals Sig6 individually input from the four wheel speed sensors 61.

A starter motor 8c is installed to the engine 8. Electrical power stored in an electricity storage device 80 such as a battery is supplied to the starter motor 8c when an ignition switch (not illustrated) has been switched ON. The starter motor 8c is driven by stored electrical power supplied from the electricity storage device 80 to start the engine 8.

An electricity generator 8e such as an alternator is installed to the engine 8. When the engine 8 is running, the electricity generator 8e generates electrical power using driving force of the engine 8. The electrical power generated by the electricity generator 8e (the generated electrical power) is stored in the electricity storage device 80.

An engine controller 8b, which controls the engine 8, detects the rotation speed of the engine 8, and inputs a detection signal (a rotation speed signal Sig4) to the brake controller 7. The brake controller 7 acquires the rotation speed of the engine 8 using the rotation speed signal Sig4.

A parking brake lever (a PB lever 30) is installed to the vehicle 10. The PB lever 30 is, for example, connected by wires 31 to the rear brake operation sections 6R installed to the rear wheels (the rear right wheel 11RR and the rear left wheel 11RL). The rear brake operation sections 6R are actuated and the rear wheels (the rear right wheel 11RR and the rear left wheel 11RL) are locked by operation of the PB lever 30. The vehicle 10 is thereby maintained in a stationary state. In the present embodiment, the rear brake operation sections 6R serve as a parking brake device. The parking brake device (the rear brake operation sections 6R) is actuated when the PB lever 30 is, for example, operated by the driver, and the rear wheels (the rear right wheel 11RR and the rear left wheel 11RL) are locked.

Note that the vehicle 10 may be a vehicle in which the front brake operation sections 6F are installed as the parking brake device. In such cases, the PB lever 30 and the front brake operation sections 6F are connected, for example, by wires (not illustrated). The front brake operation sections 6F are then actuated when the PB lever 30 is, for example, operated by the driver, and the front wheels (the front right wheel 11FR and the front left wheel 11FL) are locked.

Configuration may be made with a parking brake pedal (not illustrated) for foot-press operation by the driver, for example, installed in place of the PB lever 30.

A parking brake sensor (a PB sensor 30a) is installed to the PB lever 30. The PB sensor 30a detects an operation amount of the PB lever 30, and outputs the detection signal thereof (a PB signal Sig7). The PB signal Sig7 is input to the brake controller 7. The brake controller 7 computes an operation amount of the PB lever 30 using the PB signal Sig7.

An airbag device 20 is installed to the vehicle 10. The airbag device 20 includes an airbag 21 and an airbag controller 22. The airbag 21 is housed in a folded state inside, a steering wheel 23, and is inflated when an inflator (not illustrated) has been operated by a signal (an airbag operation signal Sig2) from the airbag controller 22.

The airbag controller 22 actuates the airbag device 20 based on a signal (a collision detection signal Sig1) input from a collision detection sensor 24 installed to the vehicle 10. More specifically, when input with the collision detection signal Sig1 from the collision detection sensor 24, the airbag controller 22 sends the airbag operation signal Sig2 to the inflator and inflates the airbag 21. The collision detection sensor 24 inputs the collision detection signal Sig1 to the airbag controller 22 when there is an impact to the vehicle 10 that is greater than a certain threshold value. That is, in the present embodiment, the collision detection sensor 24 is a sensor that detects impacts to the vehicle 10.

The collision detection sensor 24 may be configured to output the collision detection signal Sig1 corresponding to the magnitude of the impact to the vehicle 10. In such cases, the airbag controller 22 outputs the airbag operation signal Sig2 and inflates the airbag 21 when the magnitude of the impact computed from the collision detection signal Sig1 is greater than a certain threshold value.

In the airbag controller 22 of the present embodiment, a certain signal (an airbag actuation signal Sig3) is input to the brake controller 7 when the airbag device 20 has been actuated. The brake controller 7 detects actuation of the airbag device 20 using the airbag actuation signal Sig3.

Figure 2:
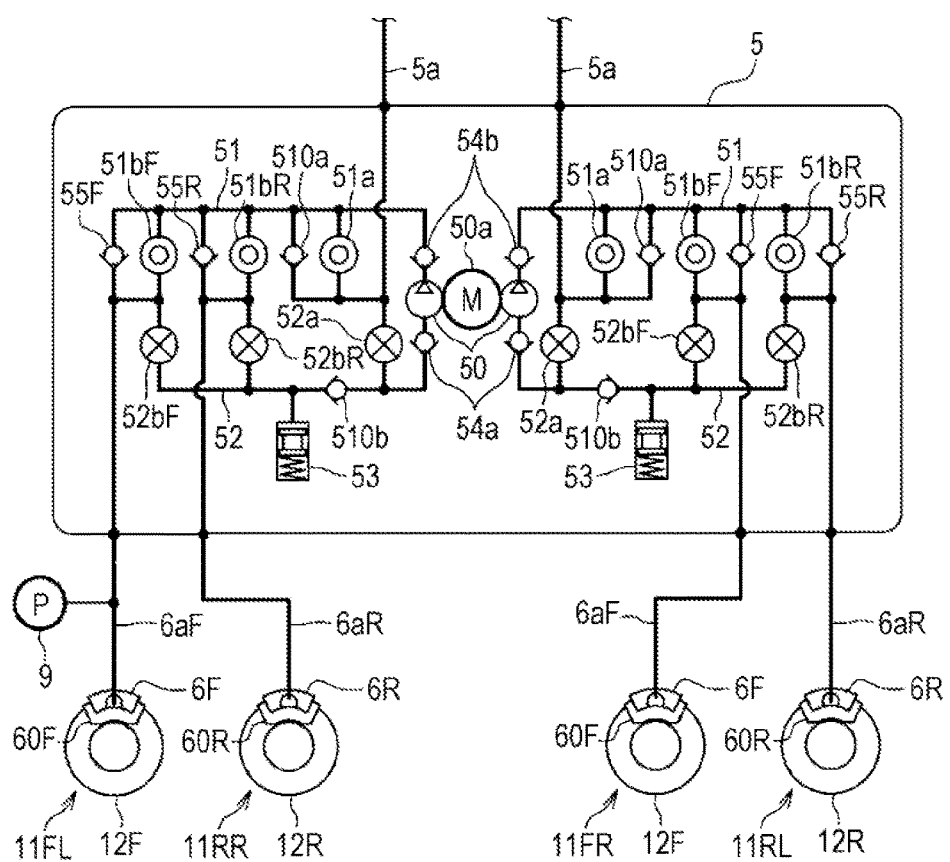
FIG. 2 is a diagram illustrating a configuration of a vehicle stabilization device.
Figure 3:
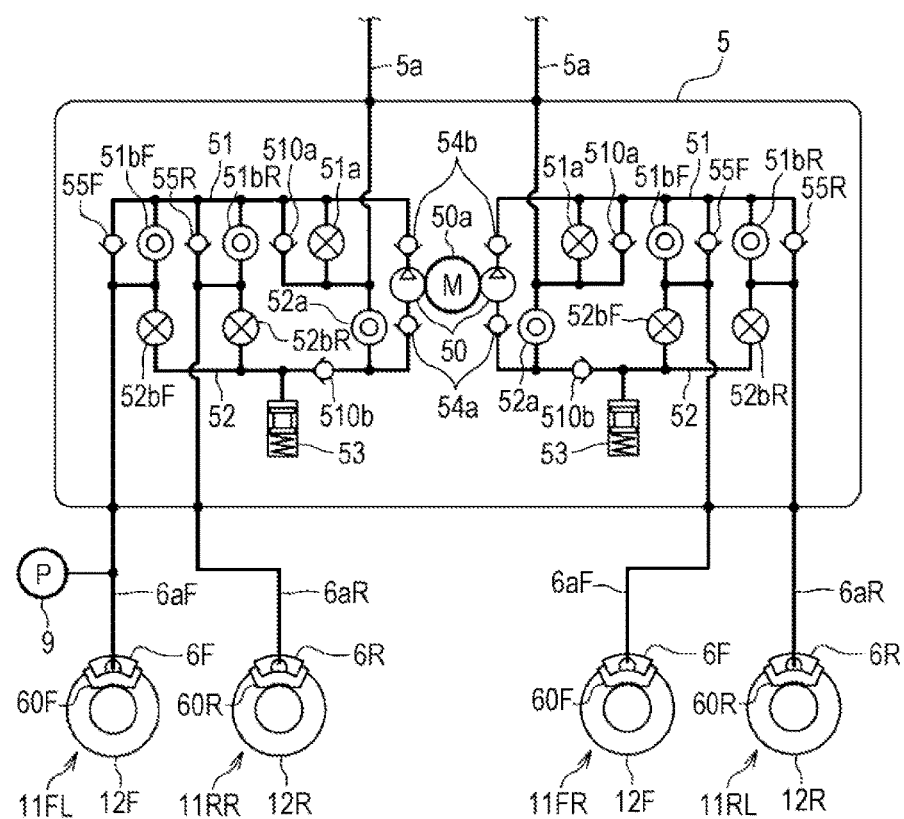
FIG. 3 is a diagram illustrating a vehicle stabilization device when automatic braking is being actuated.

FIG. 2 illustrates a configuration of a vehicle stabilization device. FIG. 3 is a diagram illustrating a state of the vehicle stabilization device when automatic braking is being actuated. Mote that open valves are shown by circles, and closed valves are shown by crosses in FIGS. 2 and 3.

The vehicle stabilization device 5 adjusts the hydraulic pressure generated in the master cylinder 4 (see FIG. 1) in response to a command (the hydraulic pressure generation command Ctl1) received from the brake controller 7 (see FIG. 1), and supplies the adjusted hydraulic pressure to the front brake operation sections 6F and the rear brake operation sections 6R.

As illustrated in FIG. 2, the vehicle stabilization device 5 is configured by two systems (hydraulic systems) corresponding to the two hydraulic chambers 4c (see FIG. 1) formed in the master cylinder 4. The two hydraulic systems are configured the same as each other.

One of the hydraulic systems in the vehicle stabilization device 5 supplies hydraulic pressure to the front brake operation section 6F of the front left wheel 11FL and to the rear brake operation section 6R of the rear right wheel 11RR. The other hydraulic system in the vehicle stabilization device 5 supplies hydraulic pressure to the front brake operation section 6F of the front right wheel 11FR and to the rear brake operation section 6R of the rear left wheel 11RL.

First common hydraulic pressure paths 51 and second common hydraulic pressure paths 52 are arranged in the vehicle stabilization device 5. The first common hydraulic pressure paths 51 supply hydraulic pressure to the front brake operation sections 6F and the rear brake operation sections 6R. The pipes 5a are connected to the first common hydraulic pressure paths 51 through regulator valves 51a.

First check valves 510a are installed in parallel to the regulator valves 51a. The first check valves 510a are one-way valves that enable hydraulic fluid to flow only in one direction, from the pipes 5a toward the first common hydraulic pressure paths 51.

The first common hydraulic pressure paths 51 are connected to the front pipes 6aF through front inner valves 51bF, and connected to the rear pipes 6aR through rear inner valves 51bR. The front inner valves 51bF and the rear inner valves 51bR are solenoid valves. Front check valves 55F are installed in parallel to the front inner valves 51bF, and rear check valves 55R are installed in parallel to the rear-inner valves 51bR.

The front check valves 55F are one-way valves that enable hydraulic fluid to flow only in one direction, from the front pipes 6aF toward the first common hydraulic pressure paths 51. The rear check valves 55R are one-way valves that enable hydraulic fluid to flow only in one direction, from the rear pipes 6aR toward the first common hydraulic pressure paths 51. The regulator valves 51a, the front inner valves 51bF, and the rear inner valves 51bR are normally open solenoid valves that are open when in a non-conducting state.

The regulator valves 51a and the first check valves 510a are connected to the second common hydraulic pressure paths 52 through suction valves 52a. The front inner valves 51bF and the front check valves 55F are connected to the second common hydraulic pressure paths 52 through front outer valves 52bF. The rear inner valves 51bR and the rear check valves 55R are connected to the second common hydraulic pressure paths 52 through rear outer valves 52bR.

The suction valves 52a, the front outer valves 52bF, and the rear outer valves 52bR are normally closed solenoid valves that are closed when in a non-conducting state.

Reservoir devices 53 are installed to the second common hydraulic pressure paths 52. The reservoir devices 53 temporarily store hydraulic fluid.

Second check valves 510b are provided in the second common hydraulic pressure paths 52, between the reservoir devices 53 and the suction valves 52a. The second check valves 510b are one-way valves that enable hydraulic fluid to flow only in one direction, from reservoir devices 53 toward the suction valves 52a.

Pumps 50 that feed hydraulic oil from the second common hydraulic pressure paths 52 to the first common hydraulic pressure paths 51, and an electric motor 50a that drives the pumps 50, are installed to the vehicle stabilisation device 5. Stored electrical power is supplied from the electricity storage device 80 (see FIG. 1) to the electric motor 50a. The electric motor 50a is driven by the stored electrical power supplied from the electricity storage device 80.

The vehicle stabilisation device 5 also includes suction valves 54a, installed on the second common hydraulic pressure paths 52 on the intake side of the pumps 50, and discharge valves 54b, installed on the first common hydraulic pressure paths 51 on the outlet side of the pumps 50.

The brake controller 7 (see FIG. 1) controls the regulator valves 51a, the front inner valves 51bF, the rear inner valves 51bR, the suction valves 52a, the front outer valves 52bF, the rear outer valves 52bR, and the electric motor 50a all of which are installed in the vehicle stabilization device 5.

The brake controller 7 (see FIG. 1) normally controls the vehicle stabilization device 5 such that the regulator valves 51a, the front inner valves 51bF, and the rear inner valves 51bR are open, and the suction valves 52a, the front outer valves 52bF, and the rear outer valves 52bR are closed.

The hydraulic pressure generated by the master cylinder 4 (see FIG. 1) is input to the vehicle stabilisation device 5 through the pipes 5a, and supplied to the first common hydraulic pressure paths 51 through the regulator valves 51a. The hydraulic pressure supplied to the first common hydraulic pressure paths 51 is supplied to the front pipes 6aF through the front inner valves 51bF, and supplied to the front brake operation sections 6F. The hydraulic pressure supplied to the first common hydraulic pressure paths 51 is supplied to the rear pipes 6aR through the rear inner valves 51bR, and supplied to the rear brake operation sections 6R.

When the airbag actuation signal Sig3 is input to the brake controller 7 (see FIG. 1) from the airbag controller 22 (see FIG. 1), the brake controller 7 controls the vehicle stabilization device 5 so as to actuate automatic braking. Upon receiving the airbag actuation signal Sig3, the brake controller 7 controls the vehicle stabilization device 5 so as to open the suction valves 52a, and to close the regulator valves 51a. The brake controller 7 also control the vehicle stabilization device 5 so as to open the front inner valves 51bF and the rear inner valves 51bR, and to close the front outer valves 52bF and the rear outer valves 52bR.

Thus, as illustrated in FIG. 3, the regulator valves 51a, the front outer valves 52bF, and the rear outer valves 52bR are closed, and the suction valves 52a, the front inner valves 51bF, and the rear inner valves 51bR are open. The brake controller 7 then drives the electric motor 50a.

When the electric motor 50a is driven, the hydraulic oil of the second common hydraulic pressure paths 52 is pressurized by the pumps 50, and a hydraulic pressure is generated. This hydraulic pressure is supplied to the front brake operation sections 6F through the first common hydraulic pressure paths 51, the front inner valves 51bF, and the front pipes 6aF. The front brake operation sections 6F are actuated by the supplied hydraulic pressure, and generate braking force.

Similarly, the hydraulic pressure generated by driving the electric motor 50a is supplied to the rear brake operation sections 6R through the first common hydraulic pressure paths 51, the rear inner valves 51bR and the rear pipes 6aR. The rear brake operation sections 6R are actuated by the supplied hydraulic pressure, and generate braking force.

Since the suction valves 52a are open, the hydraulic oil from the hydraulic chambers 4c of the master cylinder 4 (see FIG. 1) and from the reservoir tank 40 (see FIG. 1) is also supplied into the pumps 50.

When this is performed, the brake controller 7 (see FIG. 1) acquires a caliper pressure (the hydraulic pressure in the front pipe 6aF) based on the hydraulic pressure signal Sig5 input from the hydraulic pressure gauge 9, and drives the pumps 50 such that the caliper pressure achieves a certain pressure.

For example, a standard caliper pressure when automatic braking is actuated (hereafter referred to as a standard hydraulic pressure) is set in advance based on, for example, the driving performance of the vehicle 10 (see FIG. 1). When automatic braking is actuated, the brake controller 7 (see FIG. 1) drives the pumps 50 such that the caliper pressure (the hydraulic pressure in the front pipe 6aF) is maintained at the standard hydraulic pressure on the basis of the hydraulic pressure signal Sig5 input from the hydraulic pressure gauge 9.

The standard hydraulic pressure is appropriately set as a design value according, for example, to the driving performance of the vehicle 10.

The vehicle stabilisation device 5 is configured to generate hydraulic pressure using the pumps 50 driven by the electric motor 50a. Thus, the electric motor 50a and the pumps 50 in the present embodiment configure an electrical pressurizing device that generates hydraulic-pressure in the vehicle stabilization device 5.

In the vehicle stabilization device 5 of the present embodiment, the electric motor 50a and the pumps 50 are installed as the pressurizing device; however, the configuration of the pressurizing device is not limited thereto. For example, a pressurizing device may be the pressurizing device that generates hydraulic pressure using a piston device driven by an electromagnetic solenoids (not illustrated).

Thus the brake controller 7 illustrated in FIG. 1 actuates automatic braking when receiving the airbag actuation signal Sig3 from the airbag controller 22 as described above.

As stated above, the airbag controller 22 actuates the airbag device 20 when the collision detection signal Sig1 has been input, from the collision detection sensor 24. The collision detection sensor 24 inputs the collision detection signal Sig1 to the airbag controller 22 when an impact to the vehicle 10 has been detected. The brake controller 7 actuates automatic braking when receiving the airbag actuation signal Sig3 from the airbag controller 22 that has actuated the airbag device 20. That is, the brake controller 7 of the present embodiment is configured to send a command (the hydraulic pressure generation command Ctl1) to the vehicle stabilization device 5 when the collision detection sensor 24 installed to the vehicle 10 has detected a force of impact, so as to generate hydraulic pressure and to actuate automatic braking.

When automatic braking is actuated with the engine 8 in a stopped state (in a state of the rotation speed of the engine 8 being zero), the brake controller 7 of the present embodiment, illustrated in FIG. 1, controls the vehicle stabilization device 5 in accordance with the state of the vehicle 10, and generates braking force in accordance with the state of the vehicle 10.

For example, when automatic braking is actuated in a state in which the engine 8 has stopped and the PB lever 30 has been operated to actuate the rear brake operation sections 6R, the brake controller 7 causes hydraulic pressure to be supplied to the front brake operation sections 6F alone, and the front brake operation sections 6F are actuated. That is, the brake controller 7 causes hydraulic pressure to be supplied to the front brake operation sections 6F installed to the wheels (the front left wheel 11FL and the front right wheel 11FR) that have not been locked by actuation of the parking brake device (actuation of the rear brake operation sections 6R), and the front brake operation sections 6F are actuated.

As a result, the electrical power required of the electric motor 50a of the vehicle stabilization device 5 is suppressed more than in configurations in which hydraulic pressure is supplied to both the front brake operation sections 6F and the rear brake operation sections 6R. Accordingly, the electrical power consumed by the electric motor 50a is suppressed, and exhaustion of the electrical power stored in the electricity storage device 80 (see FIG. 1) is suppressed. Mote that in such cases a configuration may be adopted in which the vehicle stabilization device 5 is controlled such that the hydraulic pressure supplied to the front brake operation sections 6F is lower than the standard hydraulic pressure. In cases in which the hydraulic pressure supplied to the front brake operation sections 6F is lower than the standard hydraulic pressure, the braking force generated in the vehicle 10 is smaller than when the standard hydraulic pressure is supplied to the front brake operation sections 6F.

Moreover, the brake controller 7 controls the vehicle stabilization device 5 such that a lower hydraulic pressure is generated than the standard hydraulic pressure when the engine 8 is in a stopped state and the PB lever 30 is not in an operated state (a state in which the parking brake device has not been actuated). The hydraulic pressure generated in the vehicle stabilization device 5 is supplied to the front brake operation sections 6F and the rear brake operation sections 6R. A smaller braking force is accordingly generated in the vehicle 10 than in cases in which the standard hydraulic pressure is supplied to the front brake operation sections 6F and the rear brake operation sections 6R. Thus, electrical power for driving the electric motor 50a of the vehicle stabilization device 5 is suppressed due to supplying a hydraulic pressure lower than the standard hydraulic pressure to the front brake operation sections 6F and the rear brake operation sections 6R, enabling exhaustion of the electrical power stored in the electricity storage device 80 (see FIG. 1) to foe suppressed.

Note that in the vehicle 10, electrical power is supplied from the electricity storage device 80 (see FIG. 1) to electrical components such as the collision detection sensor 24, the airbag controller 22, and the brake controller 7 in cases in which the ignition switch (not illustrated) has been set to ACC (a switch position indicating that accessories are ON, and electrical power is supplied to the electrical components without the engine 8 being driven), and for a certain period of time after the ignition switch has been switched to OFF from the engine 8 driven state and the engine 8 has stopped.

Such a state in which electrical power is supplied from the electricity storage device 80 to electrical components with the engine 8 in a stopped state is referred to as "a battery drive state" below.

The brake controller 7 actuates automatic braking when the collision detection sensor 24 has detected an impact during the battery drive state. For example, due to actuation of the automatic braking, the vehicle 10 is stopped effectively when the vehicle 10 is started in motion by the impact.

Figure 4:
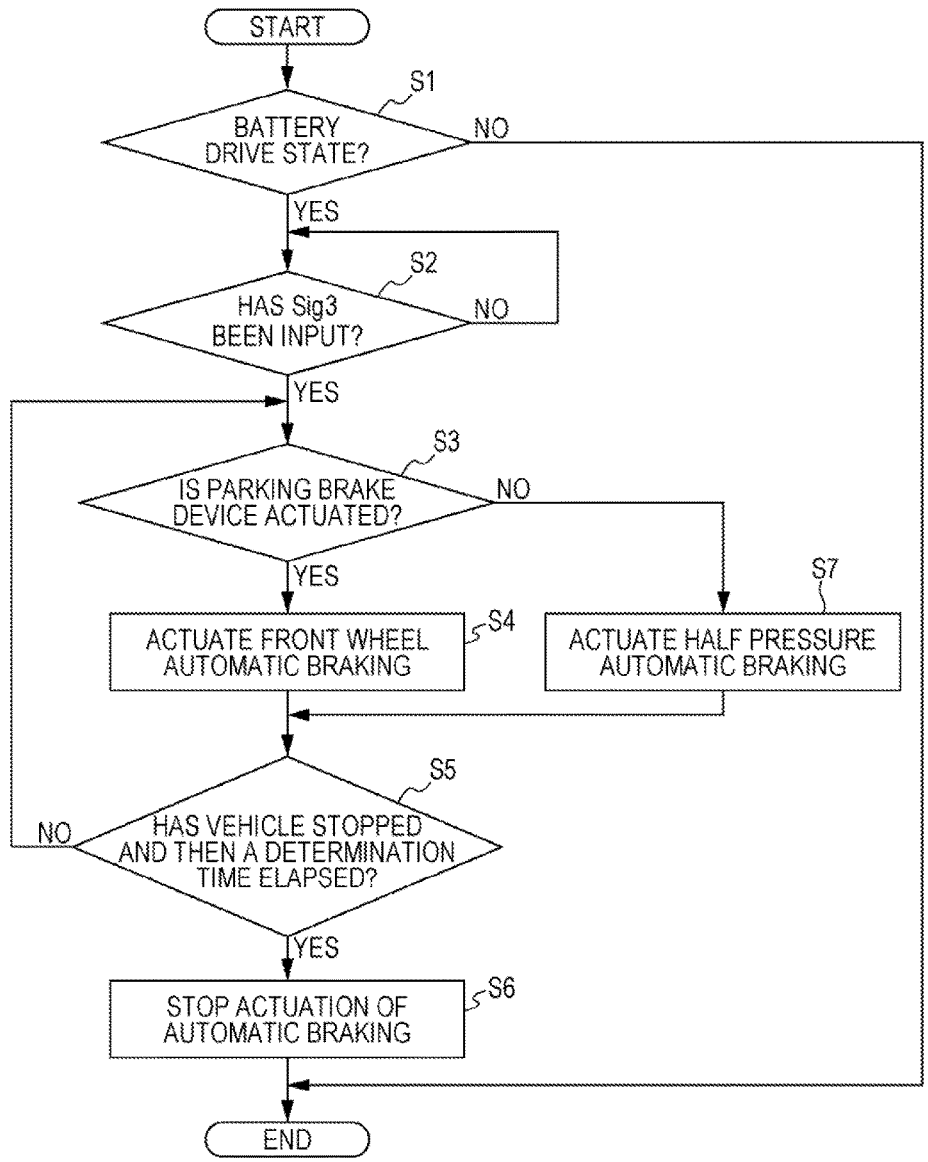
FIG. 4 is a flowchart illustrating a procedure by which a brake controller actuates automatic braking.
Figure 5:
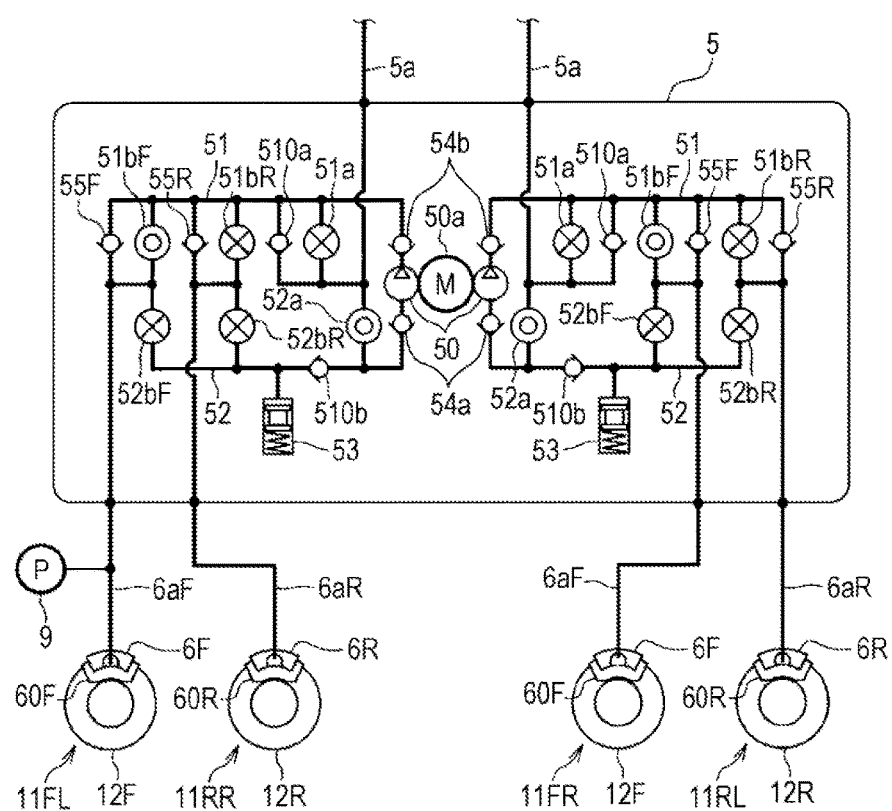
FIG. 5 is a diagram illustrating a vehicle stabilization device when front wheel automatic braking is being actuated.

FIG. 4 is a flowchart illustrating a procedure by which the brake controller actuates automatic braking. FIG. 5 is a diagram illustrating a vehicle stabilization device when front wheel automatic braking is actuated. Open valves are shown by circles, and closed valves are shown by crosses in FIG. 5.

A procedure by which the brake controller 7 according to the present embodiment (see FIG. 1) actuates automatic braking is described with reference to FIGS. 4 and 5 (and with reference to FIGS. 1 to 3, where appropriate).

The brake controller 7 determines whether or not the vehicle 10 is in a battery drive state (step S1). At step S1, the brake controller 7 computes the rotation speed of the engine S from the rotation speed signal Sig4 input from the engine controller 8b. The brake controller 7 determines that the engine 8 is stopped when this computed value is zero (or around zero). The brake controller 7 determines that the vehicle 10 is in a battery drive state when the brake controller 7 determines that the engine 8 has been stopped.

The brake controller 7 ends the current procedure when the brake controller 7 determines that the vehicle 10 is not in a battery drive state (No in step S1). When the airbag actuation signal Sig3 is input in such cases, the brake controller 7 controls the vehicle stabilization device 5 so as to generate the standard hydraulic pressure, supplies the hydraulic pressure generated in the vehicle stabilization device 5 to the front brake operation sections 6F and the rear brake operation sections 6R, and actuates automatic braking normally.

When the brake controller 7 determines that the vehicle 10 is in a battery drive state (Yes in step S1), the brake controller 7 stands-by until the airbag actuation signal Sig3 is input from the airbag controller 22 (No in step S2), and the process proceeds to step S3 when the airbag actuation signal Sig3 has been input (Yes in step S2).

At step S3, the brake controller 7 determines whether or not the parking brake device is actuated. The brake controller 7 computes an operation amount of the PB lever 30 based on the PB signal Sig7 input from the PB sensor 30a. The brake controller 7 determines that the parking brake device is actuated (Yes in step S3) in cases in which the operation amount of the PB lever 30 is a certain threshold value or greater.

The threshold value for the operation amount of the PB lever 30 when the brake controller 7 determines that the parking brake device is actuated is preferably set as a design value of the vehicle 10.

The process proceeds to step S4 when the brake controller 7 determines that the parking brake device is actuated (Yes in step S3), and the brake controller 7 actuates automatic braking (front wheel automatic braking). At step S4, the brake controller 7 controls the vehicle stabilization device 5 such that hydraulic pressure is only supplied to the front brake operation sections 6F, and actuates automatic braking (front wheel automatic braking).

More specifically, the brake controller 7 controls the vehicle stabilization device 5 so as to open the suction valves 52a and close the regulator valves 51a. The brake controller 7 further controls the vehicle stabilization device 5 so as to close the front outer valves 52bF and the rear outer valves 52bR. Moreover, the brake controller 7 controls the vehicle stabilization device 5 so as to open the front inner valves 51bF and to close the rear inner valves 51bR.

As illustrated in FIG. 5, the vehicle stabilization device 5 is in a state in which the suction valves 52a and the front inner valves 51bF are open, and the regulator valves 51a, the front outer valves 52bF, the rear outer valves 52bR, and the rear inner valves 51bR are closed.

The brake controller 7 drives the electric motor 50a (the pumps 50).

The brake controller 7 computes the caliper pressure (the hydraulic pressure of the front pipes 6aF), based on the hydraulic pressure signal Sig5 input from the hydraulic pressure gauge 9. For example, the brake controller 7 drives the electric motor 50a (the pumps 50) such that the caliper pressure is a hydraulic pressure of half the standard hydraulic pressure.

Explanation now returns to FIG. 4. If the brake controller 7 determines that the vehicle 10 has stopped and a certain period of time has elapsed in a stationary state (Yes in step S5), actuation of the automatic braking (front wheel automatic braking) is stopped (step S6). The brake controller 7 stops actuation of automatic braking (step S6), stops the pumps 50 (the electric motor 50a) of the vehicle stabilization device 5, and closes the suction valves 52a. The brake controller 7 opens the front inner valves 51bF, the rear inner valves 51bR, and the regulator valves 51a.

The brake controller 7 returns to step S3 until the vehicle 10 is stationary and the certain period of time has elapsed (No in step S5).

When the brake controller 7 determines at step S3 that the parking brake device is not actuated (No in step S3), the process proceeds to step S7, and actuates automatic braking (half pressure automatic braking). At step S7, the brake controller 7 controls the vehicle stabilisation device 5 such that hydraulic pressure is supplied to the front brake operation sections 6F and the rear brake operation sections 6R, so as to actuate the automatic braking (half pressure automatic braking).

More specifically, the brake controller 7 controls the vehicle stabilization device 5, opens the suction valves 52a, and closes the regulator valves 51a. The brake controller 7 controls the vehicle stabilization device 5, opens the front inner valves 51bF and the rear inner valves 51bR, and closes the front outer valves 52bF and the rear outer valves 52bR. The vehicle stabilization device 5 is in the state illustrated in FIG. 3 (a state of the vehicle stabilization device 5 when the automatic braking is actuated). The brake controller 7 drives the electric motor 50a (the pumps 50).

That is, when the brake controller 7 actuates the half pressure automatic braking, the brake controller 7 allows the vehicle stabilization device 5 to be in a similar state to that when normal automatic braking is actuated.

The brake controller 7 computes the caliper pressure (the hydraulic pressure of the front pipes 6aF), based on the hydraulic pressure signal Sig5 input from the hydraulic pressure gauge 9. The brake controller 7 drives the electric motor 50a (the pumps 50) such that the caliper pressure is a hydraulic pressure of half the standard hydraulic pressure.

Subsequently, as illustrated in FIG. 4, the brake controller 7 proceeds to step S5, and when the brake controller 7 determines that the vehicle 10 is in a stationary state and that the certain period of time has elapsed in the stationary state (Yes in step S5), the brake controller 7 stops actuation of the automatic braking (half pressure automatic braking) (step S6). Note that the brake controller 7 returns to step S3 until the vehicle 10 is in the stationary state and the certain period of time has elapsed (No in step S5).

As stated above, the brake controller 7 according to the present embodiment illustrated in FIG. 1 actuates automatic braking when the airbag actuation signal Sig3 has been input from the airbag controller 22.

If at this time the engine 8 is in a stationary state (the battery drive state), the brake controller 7 actuates automatic braking in accordance with the state of the parking brake device.

The brake controller 7 actuates the front wheel automatic braking in cases in which the parking brake device is in an actuated state while in the battery drive state.

In front wheel automatic braking, the hydraulic pressure (the caliper pressure) generated by the vehicle stabilisation device 5 is supplied only to the front brake operation sections 6F. This enables the electrical power required of the electric motor 50a (see FIG. 2) to be less than in cases in which the caliper pressure is supplied to both the front brake operation sections 6F and the rear brake operation sections 6R, thereby suppressing the electrical power consumed by the electric motor 50a. This suppresses exhaustion of the electrical power stored in the electricity storage device 80 (see FIG. 1).

In actuating the front wheel automatic braking, the caliper pressure supplied to the front brake operation sections 6F is smaller than the standard hydraulic pressure (for example, the caliper pressure is set to half the standard hydraulic pressure). Thus, the electrical power required of the electric motor 50a (see FIG. 2) is less than in cases in which the standard hydraulic pressure is generated in the vehicle stabilization device 5, thereby suppressing the electrical power consumed by the electric motor 50a. This suppresses exhaustion of the electrical power stored in the electricity storage device 80 (see FIG. 1).

In front wheel automatic braking, the caliper pressure is not supplied from the vehicle stabilization device 5 to the rear brake operation sections 6R. However, the rear brake operation sections 6R are actuated by actuation of the parking brake device, and the vehicle 10 is in a stationary state, and thus sufficient braking force is generated to stabilize the behavior of the vehicle 10. Moreover, the electrical power consumed by the electric motor 50a is suppressed, and exhaustion of the stored electrical power of the electricity storage device 80 (see FIG. 1) is suppressed.

Moreover, caliper pressure supplied from the vehicle stabilisation device 5 to the front brake operation sections 6F is smaller than the standard hydraulic pressure (for example, the caliper pressure is half the standard hydraulic pressure). The electrical power required of the electric motor 50a is accordingly suppressed, the electrical power consumed by the electric motor 50a is suppressed, and exhaustion of the stored electrical power is suppressed.

Moreover, the brake controller 7 actuates the half pressure automatic braking in cases in which the parking brake device is not in an actuated state while the vehicle 10 is in a battery drive state.

In the half pressure automatic braking, a hydraulic pressure of half the standard hydraulic pressure is generated in the vehicle stabilization device 5, and supplied, as the caliper pressure, to the front brake operation sections 6F and the rear brake operation sections 6R. Thus, the electrical power required of the electric motor 50a (see FIG. 2) is accordingly less than in cases in which the standard hydraulic pressure is generated in the vehicle stabilization device 5, and the electrical power consumed by the electric motor 50a is suppressed. This suppresses exhaustion of the electrical power stored in the electricity storage device 80.

The battery drive state is a state in which the engine 8 is stopped, and is a non-generating state of the electricity generator 8e. Thus, if the electrical power-stored in the electricity storage device 80 is heavily exhausted due to driving the electric motor 50a on actuation of automatic braking, issues accordingly arise, such as not being able to start the engine 8.

The vehicle brake system 1 of the present embodiment suppresses exhaustion of the stored electrical power during actuation of automatic braking in the battery drive state. This enables the engine 8 to be started during actuation of automatic braking, and after stopping actuation of automatic braking.

In front wheel automatic braking, braking force on the rear right wheel 11RR and the rear left wheel 11RL is not generated, and in half pressure automatic braking, the caliper pressure is half the standard hydraulic pressure. Thus, the braking force generated by actuation of the front wheel automatic braking and the half pressure automatic braking is smaller than the braking force generated during normal automatic braking.

In a battery drive state, the vehicle 10 is in a stationary state, and sometimes the driver, for example, is in a relaxed posture. Thus in such cases the driver, for example, is impacted by braking force while in an unstable posture if a large braking force is generated on actuation of automatic braking.

In the vehicle brake system 1 of the present embodiment, the braking force generated by the automatic braking (front wheel automatic braking, half pressure automatic braking) in the battery drive state is smaller than the braking force generated during normal automatic braking. Thus, the impact from the braking force is smaller, and the impact to the driver, for example, is smaller. The effect on the driver by the impact of the braking force generated when the driver, for example, is in a relaxed posture, can accordingly be suppressed to a small amount.

In the present application, appropriate design change may be made within a scope not departing from the spirit of the present application.

For example, the brake controller 7 of the present embodiment (see FIG. 1) determines actuation of the front wheel automatic braking or the half pressure automatic braking in accordance with the operation amount of the PB lever 30 (see FIG. 1).

For example, in cases in which an automatic transmission is installed to the vehicle 10 (see FIG. 1), the brake controller 7 may be configured so as to actuate the automatic braking to supply the caliper pressure to the brake operation sections installed to wheels other than the drive wheels when the airbag actuation signal Sig3 has been input while the parking range (P range) is selected in the battery drive state.

In an automatic transmission, the drive wheels are locked when the parking position has been selected. Thus, the vehicle 10 is effectively braked by supplying caliper pressure to the brake operation sections installed to the wheels other than the drive wheels, and by generating braking force thereon.

In actuation of the front wheel automatic braking, although the caliper pressure supplied to the front brake operation sections 6F (see FIG. 1) is half the standard hydraulic pressure, there is no limit to such a configuration.

The caliper pressure supplied to the front brake operation sections 6F during actuation of the front wheel automatic braking may be the standard hydraulic pressure, or may be a caliper pressure lower than the standard hydraulic pressure. There is no limitation to the ratio of the caliper pressure to the standard hydraulic pressure.

In the vehicle brake system 1 of the present embodiment (see FIG. 1), automatic braking (half pressure automatic braking) is actuated with a caliper pressure of half the standard hydraulic pressure generated when the parking brake device is not actuated in the battery drive state. There is no limitation to such a configuration, and configuration may be made such that the automatic braking is actuated with a caliper pressure generated that is lower than the standard hydraulic pressure in cases in which the parking brake device is not actuated in the battery drive state. The magnitude of the caliper pressure, when automatic braking is actuated in cases in which the parking brake device is not actuated in the battery drive state, is not limited within a range smaller than the standard hydraulic pressure.

Technology of the present application may be applicable to an electric servo brake (ESB) system. An electric servo brake system generates hydraulic pressure using an electric piston that displaces in accordance with the foot-press operation amount of the brake pedal 2 illustrated in FIG. 1.

There are electric servo brake systems that are not capable of supplying hydraulic pressure independently to the front brake operation sections 6F installed to the front wheels (the front left wheel 11FL and the front right wheel 11FR) and to the rear brake operation sections 6R installed to the rear wheels (the rear right wheel 11RR and the rear left wheel 11RL). In such cases, when the airbag actuation signal Sig3 is input with the parking brake device in an actuated state while in the battery drive state, the brake controller 7 controls the vehicle stabilization device 5 so as to generate the hydraulic pressure of half the standard hydraulic pressure, and to supply the generated hydraulic pressure to the front brake operation sections 6F and the rear brake operation sections 6R. Thus, the present application is applicable to electric servo brake systems, by the brake controller 7 actuating the half pressure automatic braking, with a hydraulic pressure of half the standard hydraulic pressure as the caliper pressure, when automatic braking is actuated with the parking brake device in an actuated state while in the battery drive state.

What is claimed is:

1. A vehicle brake system comprising:
   a brake controller installed in a vehicle to control the vehicle brake system;
   a sensor installed in the vehicle and configured to be able to detect a collision impact on the vehicle in a state where the vehicle and an engine of the vehicle are stopped;
   a first hydraulic pressure generator that generates a hydraulic pressure in hydraulic oil in accordance with a driver's operation through a brake actuation member;
   a second hydraulic pressure generator that generates a hydraulic pressure in the hydraulic oil in response to a hydraulic pressure generation command received from the brake controller for automatic braking; and
   at least one brake device that is operatively connected to the first and second hydraulic pressure generators and that is able to be actuated by the hydraulic pressure from the first hydraulic pressure generator or by the hydraulic pressure from the second hydraulic pressure generator to generate and apply braking force to at least one of wheels of the vehicle, wherein
   the brake controller sends the hydraulic pressure generation command to the second hydraulic pressure generator, thereby causing the second hydraulic pressure generator to generate the hydraulic pressure and perform the automatic braking when the sensor detects the collision impact, and
   the brake controller controls the automatic braking such that the braking force generated by the second hydraulic pressure generator when the sensor detects the collision impact in a state where the vehicle and the engine of the vehicle are stopped is smaller than the braking force generated by the second hydraulic pressure generator when the engine is running.

2. The vehicle brake system according to claim 1, wherein
   the vehicle brake system comprises a plurality of the brake devices installed in a plurality of the wheels, respectively, and further comprises a parking brake device that locks at least one of the wheels and maintains the vehicle in a stationary state,
   when the sensor detects the collision impact in a state in which the at least one of the wheels is locked by the parking brake device, the brake controller controls the automatic braking in a manner that brakes at least one of the wheels that is not locked, other than the at least one of the wheels that is locked.

3. The vehicle brake system according to claim 1, wherein
   the second hydraulic pressure generator comprises an electrical pressurizing device that is driven to generate the hydraulic pressure in response to the hydraulic pressure generation command; and
   the brake controller controls the pressurizing device to perform the automatic braking such that the hydraulic pressure generated by the pressurizing device when the engine is stopped is smaller than the hydraulic pressure generated by the pressurizing device when the engine is running.

* * * * *